United States Patent [19]
Fond

[11] Patent Number: 5,897,899
[45] Date of Patent: Apr. 27, 1999

[54] CARTRIDGES CONTAINING SUBSTANCES FOR BEVERAGE PREPARATION

[75] Inventor: Olivier Fond, Kobe, Japan

[73] Assignee: Nestec S.A., Vevey, Switzerland

[21] Appl. No.: 08/203,891

[22] Filed: Feb. 28, 1994

Related U.S. Application Data

[63] Continuation-in-part of application No. 07/869,526, Apr. 16, 1992, abandoned, and application No. 07/880,173, May 6, 1992, Pat. No. 5,402,707.

[30] Foreign Application Priority Data

| May 8, 1991 | [EP] | European Pat. Off. | 91107462 |
| May 10, 1991 | [EP] | European Pat. Off. | 91107650 |
| Jul. 8, 1991 | [EP] | European Pat. Off. | 91111317 |
| Jan. 28, 1992 | [EP] | European Pat. Off. | 92101389 |

[51] Int. Cl.$^6$ .............................. A23F 5/26
[52] U.S. Cl. ...................... 426/112; 426/77; 99/295
[58] Field of Search ................... 426/77, 79, 84, 426/433, 112; 99/295

[56] References Cited

U.S. PATENT DOCUMENTS

| 2,451,195 | 10/1948 | Brown . |
| 2,778,739 | 1/1957 | Rodth . |
| 2,899,886 | 8/1959 | Rodth . |
| 2,936,695 | 5/1960 | Donot . |
| 3,292,527 | 12/1966 | Stasse . |
| 3,403,617 | 10/1968 | Lampe . |
| 3,589,272 | 6/1971 | Bouladon . |
| 3,607,297 | 9/1971 | Fasano . |
| 3,812,273 | 5/1974 | Schmidt . |
| 3,823,656 | 7/1974 | Vander Veken . |
| 4,136,202 | 1/1979 | Favre . |
| 4,818,544 | 4/1989 | Seward . |
| 4,846,052 | 7/1989 | Favre et al. . |
| 4,853,234 | 8/1989 | Bentley et al. . |
| 5,008,013 | 4/1991 | Favre et al. . |

FOREIGN PATENT DOCUMENTS

| 389141 | 9/1990 | European Pat. Off. . |
| 1537031 | 7/1968 | France . |
| 2033190 | 4/1970 | France . |
| 2211924 | 7/1974 | France . |
| 2617389 | 1/1989 | France . |
| 7430109 | 3/1976 | Germany . |
| 314618 | 2/1934 | Italy . |
| 605293 | 9/1978 | Switzerland . |
| 938617 | 10/1963 | United Kingdom . |
| 2255494 | 11/1992 | United Kingdom . |

Primary Examiner—Steven Weinstein
Attorney, Agent, or Firm—Vogt & O'Donnell, LLP

[57] ABSTRACT

A sealed cartridge, which need have no marks for weakening and inside which, no filter is needed, contains a substance, such as roasted and ground coffee, for being extracted under pressure. The cartridge has a cup having a base and a lateral wall extending from the base to a lip which extends laterally away from the wall about a cup opening, and the cartridge has a cover sealed to the lip to cover the opening. Either the cover or the base provides a tear face which is torn under stress during extraction of the substance under pressure for preparation of a beverage.

10 Claims, 8 Drawing Sheets

CARTRIDGES CONTAINING SUBSTANCES FOR BEVERAGE PREPARATION

CROSS-REFERENCE TO RELATED APPLICATIONS

This is a continuation-in-part application of application Ser. No. 07/869,526, filed Apr. 16, 1992, now abandoned and of application Ser. No. 07/880,173, filed May 6, 1992, now U.S. Pat. No. 5,402,707.

BACKGROUND OF THE INVENTION

This invention relates to preparation of a comestible beverage from a substance contained in a cartridge and to cartridges containing a substance for preparation of a beverage.

There are several reasons for employing cartridges to contain substances for preparation of aqueous fluid comestibles, particularly beverages, which include considerations of hygiene, optimal storage and keeping qualities of the material employed to produce the fluid comestibles and which include control of the quality and reproducibility of the fluid comestibles prepared. Among available cartridges, including those which have found particular applicability for providing single servings of espresso coffees, cartridges which are sealed and which are opened under the effect of water injected under pressure satisfy the requirements mentioned above. In general, cartridges which contain substances for the preparation of fluid comestibles may be differentiated by their opening systems and ease of use and cost of manufacture.

Great Britain Patent Specification 938,617 discloses a sealed cartridge which has an internally disposed filter positioned to form two compartments in the cartridge. The cartridge is employed for preparation of a beverage by positioning it in an infusion apparatus system which provides for piercing opposing cartridge faces. That system, however, has piercing elements exposed which could be injurious and does not ensure cleanness during extraction or easy release of the cartridge and any material contained therein on completion of extraction.

Swiss Patent 605 293 and its counterpart U.S. Pat. No. 4,136,202, disclose a cartridge which, by design, has a weakened wall formed by marks for forming a line of weakening to effect preferential tearing under the effect of pressure introduced into the cartridge. This feature, however, has a disadvantage of increasing the complexity, and hence the cost, of the cartridge because the materials used have to be fabricated very precisely if opening of the cartridge is to be correct and reproducible. In addition, unless the cartridge contains a completely soluble substance, the cartridge contains a filter which is strong enough to retain a substance, such as coffee grounds, therein during an extraction process, which itself tends to be costly.

As described by Fasano in U.S. Pat. No. 3,607,279, French Patent No. 1,537,031 and French Patent Application Publication No. 2,033,190, a first foil strip of aluminum or plastic or other air-impervious material is formed to provide a plurality of cup body pockets in the strip for containing a material for preparation of a beverage, and a second strip provides a cover for the cup pockets opposite the cup base face. To obtain a beverage, this cartridge is employed with an apparatus embodied to provide elements which pierce both the cover face and cup body base face, to provide for introduction of a liquid and release of a beverage, or which pierce only the cover for introduction of extraction fluid, in which case, liquid introduced into the cartridge is relied upon to assist opening the cup body base face to provide for release of the beverage. The apparatus system however, is difficult to manufacture and the process is difficult to carry out because of the perforated plate and spring arrangement employed for engaging the base face of the cartridge, which makes the process operations delicate and difficult to control.

As described, in particular, in the Fasano U.S. disclosure, the cartridge contains at least one filter therein except when the beverage preparation material is a liquid, and it is disclosed that it is possible to eliminate a sheet of filter material by making the pierced holes so small that they themselves serve as a filter. In the case when only the cover is pierced, it is stated that it is possible to weaken the cup base face at spaced locations or to make an entire region of the cup base face weaker than the cover face to carry out the base opening. It is stated that opening of the base is possible by replacing piercing teeth with configurations which leave marks which first weaken the cup body base material so that the body base is weakened to make it more readily penetrable under the pressure of the liquid than if the cup base face were left intact. Thus, in a first phase, weakened areas are created by mechanical action upon the face, after which, in a second phase, the effect of pressure of water introduced in the cartridge results in rupturing the face at the weakened zones. It also is disclosed that the cup body base may be weakened relative to the cover by using a thinner or otherwise inherently weaker material for the cup body, it being disclosed that the pressure at which the base face will rupture to some extent being varied by changing the thickness or compactness of the filter material above the base face.

As the Fasano disclosure teaches, the liquid introduced to prepare the beverage moves by gravity, and it is believed that, when proceeding in accordance with the process and apparatus system of the Fasano disclosures, the tearing of the face of the cartridge will not necessarily be sufficient to guarantee a regular flow of a liquid therethrough, and that the maximum pressure in the cartridge is reached during opening of the cartridge. The subsequent pressure in the cartridge, therefore, is at most equal to the pressure which effects the opening and that is fairly restrictive in terms of use for, in particular, obtaining single serving amounts from substances which require extraction in a short period of time with small amounts of water. Thus, the substances are not extracted sufficiently to achieve a desirable and/or efficient extraction, particularly in the case of such as preparation of an espresso coffee.

Accordingly, problems addressed by the present invention include how to obtain a high quality uniformly reproducible fluid comestible product from an economical carrying package and how to do so in a system which remains clean and which is easy to maintain, while utilizing the advantages of employing cartridges to contain substances for the preparation of fluid comestibles, including beverages.

SUMMARY OF THE INVENTION

In the present invention, sealed cartridges are containers in which wall surfaces, including a face surface which is opened during preparation of a fluid comestible for release of a beverage or other comestible from the cartridge, i.e., "the tear face", are formed and connected sufficiently to contain a substance before and during an extraction process. Most advantageously, the cartridges of the invention need not have filters incorporated therein, particularly filters which can withstand elevated pressure and remain intact to secure the substance in the cartridge, and the cartridge need not contain marks for weakening, including marks for forming a line or lines of weakening, a wall surface tear face for opening the cartridge for release of a beverage, although cartridges having filters and marks for weakening a wall face are not precluded from use in the process or apparati devices disclosed below. The cartridge of the present invention is easy and inexpensive to manufacture and may be used particularly for the preparation of espresso coffee which is prepared by extracting roast and ground coffee under pressure.

The present invention provides a sealed cartridge which has a lipped cup, which may be frustoconical, frustopyramidal, or hemispherical in shape, and which has a cover for covering the cup opening. The base of the cup may be, but need not be, flat and thus may assume the above-mentioned or other geometries, and the sealed cartridge may take the shapes disclosed in Swiss Patent 605 293 and U.S. Pat. No. 4,136,202, the disclosure of such being herein incorporated by reference In the present invention, the cover or the base of the cup is intended to tear under stress from the effect of pressure of an extraction fluid during an extraction process, the tearable portion having a flexible character as may be provided by a metal foil, or a plastic film or a metal/plastic composite, or a metal and/or plastic and paper fiber composite. The tear face preferably is provided by aluminum. In particularly advantageous embodiments, the, cup is at least semi-rigid, in that it has a strength sufficient to enable resisting deformation during normal handling and storage.

The present invention provides, in particular, a sealed cartridge which comprises a cup and a cup cover and a substance for preparation of a beverage contained therein, wherein the cup has a base and a sidewall extending from the base to a lip which extends laterally away from the sidewall about a cup opening and wherein the cover covers the opening and is sealed to the lip, there being no marks in the cover for weakening the cover, or the base, and no filter positioned within the cartridge.

A sealed cartridge embodiment of the present invention is characterized further in that the cover has a thickness less than a thickness of any of the cup base, sidewall and lip. In this embodiment, it is the cover which is intended to be torn under stress, and the cup is advantageously at least semi-rigid.

Further embodiments are characterized in that the sidewall is substantially frustoconical in shape and in that in the frustoconical embodiment, the diameter of the opening is greater than a diameter of the base.

The cartridge of the present invention is particularly useful for containing a substance which requires extraction for preparation of a beverage and the present invention is characterized particularly in that the substance contained in the cartridge is roast and ground coffee. In a particularly advantageous embodiment, the roast and ground coffee is a coffee suitable for preparation of an espresso coffee, which as is known in the art is a coffee which has a dark roast and a fine grind. Substances including roast and ground coffee for preparing cappucino beverages also are desirable.

Additionally, when a substance sensitive to oxidation is contained in the cartridge, such as roast and ground coffee, the elements of the cartridge are desirably substantially impervious to oxygen, such as may be provided by metal and plastic materials including such as aluminum, aluminum/plastic composites, aluminum/plastic/paper composites, substantially oxygen-impermeable plastics and multilayer plastics.

Beverage preparation, including substance extraction, may be effected by a process which is characterized in that the sealed cartridge containing at least one substance for enabling preparation of a fluid comestible product, particularly a beverage, is placed in a cartridge holder means having a base which comprises a flow grille and a relief surface element adjacent a face of the cartridge to be opened for release of the fluid comestible, after which water is introduced into the cartridge under a pressure greater than atmospheric pressure for preparing the fluid comestible from the substance and to press the face of the cartridge against the relief surface element to tear the cartridge face to enable the fluid comestible to be removed from the cartridge and pass through the relief surface element and flow grille for collection. Preferably, the water, optionally mixed with a gas such as air, is introduced into the cartridge under a pressure of from above 1 bar to about 20 bar.

The flow grille, by definition, provides and comprises a grating having orifices therethrough. The relief surface element comprises a plurality of members which define and delineate openings through which the fluid comestible may pass and may be formed with the flow grille in one integrated piece or may be a distinctly separate element, the relief surface element in all cases being positioned to form an interface between the flow grille matrix and a cartridge surface face to be opened for preparing and obtaining the fluid comestible.

In the extraction process, depending upon the configuration and arrangement of the relief surface element, when the face of the cartridge positioned adjacent the relief surface element is pressurized and reaches its breaking stress, it is torn at locations of members of the relief surface element, which may project from the relief surface element, and/or at recesses formed by the relief surface element, such as with respect to recess parts formed together with projecting members, and/or at openings between projecting members and/or recesses.

The extraction process is characterized by enabling employment of a high pressure which provides for efficient preparation of fluid comestibles, because a maximum pressure is not necessarily reached during opening of the cartridge and may be reached after opening during extraction.

DETAILED DESCRIPTION OF THE INVENTION

The following description is set forth by way of example, primarily with regard to a cartridge containing roast and ground coffee. This description, however, should not be construed to limit the invention in any way, since the cartridge of the invention is suitable for containing a variety of products or mixtures of products which are suitable for preparation of fluid comestibles by addition of water, including but not limited to tea, soluble tea or coffee, a mixture of ground coffee and soluble coffee, cocoa, or a cocoa- or chocolate-based or -supplemented product including coffee, or a soup, or a dehydrated edible substance, or for preparing other foods such as in a form of infusions, for example.

A cartridge of the present invention which contains a substance to be prepared into a fluid comestible is advantageously employed with and supported by a cartridge holder means having a base which comprises a flow grille and a relief surface element adjacent a face of the cartridge to enable tearing of the face under pressure during introduction of water, or optionally water and a gas such as air, to enable preparation of the fluid comestible.

The cartridge holder means may be embodied in a variety of shapes to accommodate a variety of shapes of cartridges including, but not limited to, frustoconical cartridges, hemispherical cartridges and inverted frustoconical cartridges, the criterion of holder shape being that at least an interior holding or support portion be shaped to substantially correspond to an outer shape of the cartridge to be held or supported for enabling preparation of a fluid comestible.

In addition, an extraction apparatus system for preparing a beverage from a material contained in the cartridge will include, in addition to a cartridge holder means and base, a cartridge holder support means and a means for introducing water, or optionally water and a gas such as air, under pressure into the cartridge, by such as an injection means, under fluid-tight conditions.

The support means may be positioned with respect to the water injection means by fixing means and include an annular element which has an internal recess which has a shape which substantially conforms to an outer shape of a cartridge to be extracted and which cooperates with a periphery of the cartridge holder means to keep the cartridge in position and to ensure fluid-tightness between the cartridge and apparatus with respect to a surface about the water injector means during fluid comestible preparation.

Although various shapes of cartridges may be adopted for the convenience of production processes or for a particular application, the sealed cartridge of the present invention employed in the process and with apparati described herein, preferably, has a sidewall at least substantially frustoconical in shape. When roast and ground coffee is the substance in the cartridge, the cartridge may have a diameter of from about 25 mm to about 60 mm and have a height of from about 10 mm to about 30 mm, and the dimensions may vary with the volume and/or amount of coffee substance to be extracted, which may vary such as from 5 g to 20 g which, and a cartridge within the scope of the above dimensions, may provide a coffee layer thickness of from about 10 mm to about 25 mm.

As will be appreciated, materials employed for forming the tear face should be such that, when impinged upon the relief surface element the tear faces, in accordance with the invention, is embodied to withstand a pressure in the interior of the cartridge above 1 bar, and particularly such as a pressure within the range of from 2 bar to 15 bar, prior to breaking and tearing, such providing for the phases of extraction discussed further below. Thicknesses of the tear face materials which, as will be appreciated, may be dependent upon their barrier properties and breaking stress, may range from about 5 $\mu$m to about 100 $\mu$m, for example.

The materials employed for the tear face should have a character of a foil, which may be provided such as with a metal such as aluminum, or of a plastic film which, preferably in the case of roast and ground coffee, is substantially impermeable to oxygen, such films being known to those skilled in the art. Composite materials may be employed, and such include, but are not limited to, for example metal/plastic, metal/plastic/paper, plastic/plastic. Plastics may include, but are not limited to, polyethylene, polypropylene, PET (polyethylene terephthalate), and acrylics and the like.

Of the foregoing materials, aluminum is preferred since it tears most easily and cleanly. On the other hand, when a multilayer tear face is employed, the presence of paper fibers, which may include such as a filter paper, and/or a stretched plastic film material, including fibers, enables a network to be formed at the location of the tears which is favorable for keeping the face integrally intact and reducing the dispersion of the coffee grounds to facilitate homogeneous extraction of the layer of coffee and for preventing coffee grounds from being dispersed from the cartridge, such as onto the flow grille.

The tear face, particularly when it is the cover, may be made of aluminum having a thickness of from about 5 $\mu$m to less than 60 $\mu$m, and particularly up to but less than 50 $\mu$m, and from about 20 $\mu$m to about 45 $\mu$m and particularly to about 40 $\mu$m, and advantageously, from about 25 $\mu$m to about 35 $\mu$m.

A multilayer cover may be made of either 20 g/m$^2$ to 60 g/m$^2$ paper fibers, plastic, such as 20 $\mu$m to 60 $\mu$m thick polyethylene, and 5 $\mu$m to 20 $\mu$m thick aluminum or EVOH (ethylene and vinyl alcohol copolymer) or PVDC (polyvinylidene chloride) 5 $\mu$m to 30 $\mu$m thick and plastic, such as polypropylene, polyethylene or polyamide, 20 $\mu$m to 100 $\mu$m thick or PET 5 $\mu$m to 30 $\mu$m thick and plastic 20 $\mu$m to 100 $\mu$m thick or metallized PET or PET provided with an upper barrier layer, such as SiO$_2$. A multilayer combination of paper fibers and aluminum may also be used, as well as a multilayer cover which has a layer based on paper fibers, which may include a filter paper, or woven, or non-woven fibers based on PET or polypropylene which may have a density of 20 g/m$^2$ to 50 g/m$^2$.

The cup advantageously may be made of aluminum having a thickness of at least greater than 20 $\mu$m, and particularly from at least greater than 50 $\mu$m. Thickness up to less than 60 $\mu$m may enable the base to be employed as the tear face, and thicknesses greater than 50 $\mu$m and up to 150 $\mu$m provide a cup which approaches being and which is at least semi-rigid.

When the cup is semi-rigid and the cover provides the tear face, the cup has a thickness of at least 60 $\mu$m, and preferably, the semi-rigid cup has a thickness particularly in the range of from about 80 $\mu$m to 120 $\mu$m and in particular, from about 90 $\mu$m to 110 $\mu$m. Also, pure plastic or a multilayer plastic, optionally with an oxygen barrier layer, such as EVOH and PVDC, a multilayer film, such as cardboard/aluminum/plastic or cardboard/plastic optionally with an oxygen barrier layer, such as EVOH of PVDC, may be employed and have like thickness.

The cover may be sealed to the lip of the cup by heat-seal welding, with such as with a welding lacquer/adhesive on opposite faces of the parts to be sealed. The cover and lip also may be crimped and/or sealed and crimped. In one embodiment, the cup lip is folded over and crimped to the cover. In another embodiment, the cover is folded over and crimped to the lip.

Use of the cartridge embodiment of the present invention for preparation of a beverage may be characterized by successive phases which, such as in the particular case of preparing espresso coffee, may be carried out in known commercially available espresso machines comprising means for injecting water, or as above, optionally water mixed with a gas such as air, under pressure, and comprising cartridge holding means for holding a cartridge in position for extraction, and having the aforedescribed grille and relief surface element and being adapted to the extent necessary for being secured for operation in the machines.

In a first phase, a cartridge containing a substance to be extracted for preparation of a beverage is placed in the cartridge holder means adjacent the holder base of the present invention, designed and adapted for being secured in the machine, so that a face of the cartridge, i.e., the tear face, is positioned adjacent the relief surface element and flow grille, without, preferably, any more or less deep impressions or similar deformations being formed in the tear face of the cartridge by members of the relief surface element.

In a second phase, the cartridge holder means containing the cartridge is introduced into the machine.

In a third phase, water, optionally mixed with air, is injected into the cartridge under a pressure of from above 1 bar to about 20 bar, and preferably from above 1 bar to about 10 bar, which thereby deforms and presses the tear face against the members of the relief surface element. In addition, this phase provides for prewetting and compaction of the coffee particles.

In a fourth phase, the material of the tear face impinges upon the relief surface element members and reaches its breaking stress, tearing begins in zones at the location of the relief surface element members, which may project, and/or in the recessed parts, i.e., in cavities or depressions formed in the members, and/or at flow openings between and defined by the members of the relief surface element. Depending on the configuration, arrangement, shape and size of the relief surface element members, tearing can also continue throughout the process, the relief element surface members, however, being configured, arranged, sized and/or shaped not only to enable formation of openings in the tear face but also to restrict and inhibit escape of the particulate, or solid phase, substance, which is being processed, from the interior of the cartridge via the openings formed in the tear face.

Upon tearing, the tear face is relieved of stress, and fractured parts of the face become pressed against the relief surface element which has the effect of enlarging the initial openings formed, thus promoting subsequent flow of the fluid, but again, in such a way which substantially restrict and inhibit solid phase substance from escaping or being dispersed outside the cartridge. Thus, the openings in the tear face formed with the aid of the relief surface element are of a size which substantially restricts and inhibits solid phase substance from escaping from the cartridges via openings in the tear face. Hence, the relief surface is configured, arranged, sized and shaped to effect this result.

Upon opening of the tear face, the pressure inside the cartridge undergoes a partial and momentary fall, but this momentary decompression is limited because the flow of fluid escaping from the cartridge is restricted both by the interstices formed by lips of the torn material of the tear face bearing against the relief surface element and by resistance provided by the flow orifices formed in the relief surface element and grille-work. Flow also is controlled, particularly in cases where a substance is extracted, by compaction of the extractable substance. Flow is thus controlled, and above all, displacement of solid phase substance from the contents of the cartridge, which could obstruct flow orifices and subsequently interfere with the uniformity and reproducibility of an extraction process, or which could unpleasantly affect a beverage or other fluid comestible product, is substantially restricted and inhibited.

In a fifth phase, the roast and ground coffee in the cartridge, is extracted under a pressure of from about 1 bar to about 20 bar, this pressure being intentionally and essentially linked to the loss of pressure through the wetted and compacted coffee. Further openings of the tear face can result in this phase when the pressure reaches high values, but again, in accordance with the most advantageous practice of the inventions, such should be of a size which substantially restricts and inhibits escape or displacement of solid phase substance from the cartridge.

In a final phase, the cartridge holder is released from the machine, and the cartridge, which may be released from the holder by an auxiliary means described hereinafter, may be removed by simple inversion of the cartridge holder.

After release from the cartridge holder, it will be is found that the cartridge and its opened tear face retain their integrity, and amounts of solid phase substance from the cartridge attached to the holder, relief surface element and flow grille are minimal, if detectable.

The flow grille preferably may be embodied by a metal plate, such as aluminum or stainless steel, for example, although it may also be made of ceramic, plastic or any other equivalent and/or suitable material. Its shape and, generally, disk-like diameter, are dependent on that of the extraction face of a cartridge to be extracted. Thus, the grille should have a surface having a size and shape substantially similar with that of a tear face of a cartridge to be processed. Generally, the grille surface size may vary in diameter from about 20 mm to about 60 mm. Its thickness may be usually from about 0.5 mm to about 5 mm, depending on the material used and its strength.

The grille grid and matrix defines a plurality of orifices which preferably are of a size which, if solid phase substance should escape the cartridge, act to substantially restrict and inhibit the solid phase from passing with fluid. The orifices are optionally circular, and in such cases, may have a mean diameter of from about 0.2 mm to about 0.5 mm. The orifices also are preferably conical in shape, generally widening downwards. Differing shapes should have equivalently similar sizings.

In the present invention, the relief surface element may have various configurations and arrangements of members, and those members may have various shapes, as noted above and as further discussed below and also illustrated in the drawing Figures. The relief surface element may have members which may project away from a basic planar surface of the element and which may or may not enable directly cutting or perforating the tear face, and in accordance with the invention, the tearing action on the tear face of the cartridge is made only possible because the relief surface element enables the tear face to reach its breaking stress during deformation under pressure. In any event, the relief surface element is configured and arranged to provide zones for substantially homogeneous distribution of and flow of the fluid comestible prepared, and hence, particularly in the case when substances are extracted, to enable efficient extraction of the substance and obtaining a quality uniform extract which is reproducible.

In one variant of the process and apparati, the cartridge tear face tears may be produced in a central part of cavities (orifice recesses), which may be formed between smoothed, arcuate projecting members of a relief surface element, by reason of the material deforming until it reaches its breaking stress. In this case, projecting members may, for example, surmount the grille. The tears continue inside cavities between the members above a zone comprising removal orifices. The material of the tear face thus liberated closely follows the shape of the projecting members under the effect of the pressure exerted. The deformation and displacement of tear face material results in an enlargement of initial tears distributed uniformly over the tear face of the cartridge. These openings thus enable the extracted fluid to flow through and from the layer of coffee grounds, or other substances, while, at the same time, inhibiting solid phase substance from being carried outside the cartridge, which is facilitated also by the solid phase substance being compacted previously under the effect of the pressure.

In a second variant of the process and apparati, the relief surface members may be accentuated to have a pointed or more sharpened nature so that tearing of the tear face of the cartridge is initiated at the relief surface element members and continues into the center of cavities (orifice recesses) formed between the elements.

In a third variant of the process and apparati, the tear face may be opened by the breaking stress of the tear face being reached at the location of members of the relief surface element, which are optionally associated with complementary members, which are not intended to tear the tear face of the cartridge but rather to deform and operate to promote liquid flow to openings and facilitate the cleanness of the system. The fluid passes between the torn and deformed parts of the tear face of the cartridge up to the flow openings because these torn parts are not pressed against the projecting members in an entirely fluid-tight manner because of a certain relative rigidity due to their fairly reduced dimensions.

In an embodiment of the apparatus, relief surface element projecting members may be in a form of rodlets which may be rectilinear, or slightly sinuous, or in a form of optionally closed arcs which may have differing lengths and which may be arranged radially, concentrically, parallel, or perpendicularly to provide for substantially homogeneous flow fluid. Their cross-section defining projecting members may be semicircular, or substantially trapezoidal, more or less flat, more or less widened downwards. Both their cross-section width and their height may be from about 0.05 mm to about 5 mm. The number of arranged rodlets may be preferably from four to sixteen, depending on the size of the flow grille, and preferably the relief surface element provides for from 4 to 50 tears in a tear face of a cartridge.

In a case of a radial arrangement of relief surface members, the rodlets may vary in length, for example, according to their position with respect to the grille surface, normally by from about 0.3 to about 1 times the grille surface size. Some may extend to a position as far as the center of the flow screen grille, while others may stop at a distance of from about 3 mm to about 8 mm therefrom. Such an arrangement is advantageous by reason of the fact that, if all of the rodlets were same length, these elements, by uniting at the center, would form a full circle which would inhibit desirable tearing of the tear face of the cartridge in a central zone and which, in addition, would prevent the fluid from being removed in that zone and thus present a dead zone.

In the case of a concentric, parallel, or perpendicular relief surface element member arrangement, the distance between the members is preferably about the same in the two axes of a horizontal plane.

In any arrangement and positioning, the members should not be situated at a distance below a minimum, which, among other variables as will be appreciated by one of ordinary skill, can depend upon the particle size of a material being extracted, for example, and which may be empirically determined. This, as one of ordinary skill will appreciate, is because, if the elements are too close together, the tear face material may be unable to deform correctly and follow the shapes of members of relief surface element. This would result, during deformation under the pressure, in a danger of coffee grounds, for example, being carried beyond the tears formed in the tear face up to the so-called dead zones. Thus, the members of the relief surface element should be arranged so that dead zones are substantially avoided so that, again, uniformity of extraction flow is achieved.

In another particular embodiment, relief surface element members, at their base, may define circular or ovoidal cavities at a position adjacent flow orifices of the grille. The depth of such cavities may be from such as about 0.5 mm to about 5 mm. The walls defining such cavities may be in a form of surfaces which are curved over all or over a part of their height or inclined faces to form an angle of from about 5° to about 30° with respect to a plane perpendicular to the surface of the relief surface element.

In other embodiments, relief surface element projecting members may be in a form of small prisms, truncated pyramids, cylinders, or frustums of optionally polygonal or circular cross-section.

In any of the above embodiments, a profile of projecting elements may have smoothed angles or be rounded so that the material of the tear face of the cartridge does not tear directly against the angles, but rather in preferential zones defined between projecting elements.

In the variants, relief surface element projection elements may form an integral part of a plate formed with filtration orifices through which the coffee flows which is advantageous particularly with the first three variants discussed above. On the other hand, the relief surface element may be in a separate piece and comprise parts projecting and recessed in relation to its main surface and orifices through with liquid may flow.

In an additional embodiment, the relative arrangement of the relief surface element and its orifices may be reversed in that the relief surface element is in one piece and comprises parts recessed in relation to its main surface and flow orifices formed at least within projecting members.

In a still further embodiment, the projecting members may be in a form of truncated pyramids, which are preferably orthogonal, and have an edge length of from about 1 mm to about 5 mm and a height of from about 0.5 mm to about 3 mm and be arranged in the form of a grid of which the spacing is usually from about 3 mm to about 7 mm. The substantially flat edges preferably form an angle of from about 10° to about 30° with the vertical. The pyramids are advantageously associated with complementary elements which are not intended to tear the tear face of the cartridge, but rather to promote the flow of the extracted fluid while retaining the grounds, for example in the form of from about 0.2 mm to about 1 mm wide ledges which surround the pyramids and about 0.7 mm to about 1.5 mm wide and about 0.3 mm to about 0.8 mm deep channels at the base. These channels are formed with flow orifices, preferably from about twelve to about fifty in number and preferably are gauged to a diameter of a few tenths of a millimeter.

Upper surface faces of the pyramids act as a support surface when the cartridge is subjected to the effect of pressure. Tearing begins on the edges of the upper faces of the pyramids. These edges should be carefully formed, with respect to the breaking stress of the material of the tear face, because if they are too cutting, the opening pressure may be too low whereas, if they are too rounded, the tear face of the cartridge might be torn unevenly at the channels formed with the flow orifices, and deposits of coffee grounds might be formed therein. The depth, width, angles and surface quality of the channels therefore may be determined so that the material of the tear face of the cartridge undergoes deformation without tearing in this zone. In general, the flow orifices are of optionally circular cross-section and are positioned preferably at the intersections of the channels and are usually conical in shape and widen downwards in order to avoid their inadvertent obstruction by particles of coffee grounds.

In the foregoing embodiment, the infusion passes between the torn and deformed parts of the tear face of the cartridge and the ledges of the pyramids and flows along the bottom of the channels to the orifices, because these torn parts cannot be pressed against the relief in perfectly fluid-tight manner because of a certain rigidity due to their fairly reduced dimensions, the narrow width of the ledges, the width and depth of the channels, the fairly sharp angles of the ledges and the intersections of the channels.

It also is pointed out that the surface of the walls of the pyramids should be smoothed to assist in avoiding coffee grounds, or other extracted substance, adhering to the walls when the cartridge is removed after extraction. This effect can be also dependent on the angle of slope of the lateral faces of the pyramids, and this angle is important for facilitating the release of the cartridge after extraction by simple inversion of the cartridge holder.

Again, in general, the dimensions and shapes of the members of the relief surface element in all the embodiments are dependent on the characteristics of the product to be infused and the dimensions and shapes are also dependent on the constituent material of the tear face of the cartridge. Moreover, the dimensions and shapes may be adapted to dimensions and shapes of a tear face which need not necessarily be flat. Thus, as will be apparent, arrangement and shaping of the relief surface element members, i.e., sharp or pointed, or rounded, for example, may readily be adapted to a particular breaking stress of a tear face material. As also should be appreciated, the combination of holder means and relief surface element should enable positioning of a cartridge tear face spaced from the relief surface element at a distance which is not so great to prevent contact of the face upon deformation with the relief surface element.

Further, in view of the foregoing, the cartridge openings should not cause an excessive loss of pressure, and it is preferred that pressure loss be resultant through the layer of coffee. However, a minimum pressure loss should be accepted at the openings for the purpose of accelerating an infusion either to form an emulsion or to form a froth typical of an espresso coffee.

For cartridges in the form of inverted frustums (such as shown in FIG. 12), a further apparatus system of the present invention comprises a water injector means, a detachable cartridge holder support means held beneath the water injector means by fixing means, a cartridge holder means and base, as discussed above, disposed in the cartridge holder support, the inner shape of the cartridge holder preferably closely following the outer shape of the cartridge to be extracted, and wherein a peripheral surface part of the water injector means cooperates with a periphery of the cartridge holder to keep the cartridge in position and to ensure fluid-tightness during the extraction process.

The water injector means may include a single injector element having a point or a system of the shower-type. The water, optionally together with a gas such as air, may be ejected from injector orifices at an angle ascending with respect to a plane defined by the flow grille, or may be injected downwards towards the flow grille into the substance to be prepared into a beverage, or both.

In another embodiment of the system according to the invention, which is similar to that of the so-called bayonet-type known to be used in espresso machines, the cartridge holder support means may comprise a handle and fastening lugs, preferably two to three in number, designed to fit onto cooperating ramps of a tightening ring integral with the machine forming a fixing means. Manipulated by means of its handle, the support makes an ascending or descending rotary movement.

In another arrangement, the cartridge holder means may be integral with an automated mechanical unit which, by known secondary means, provides for introduction of a cartridge in a hollow annular extraction element, fluid-tight locking and then, after infusion, unlocking and release of the used cartridge. The arrangement of the respective elements is thus modified, and the tear face, for example, may be disposed in a vertical plane. The same applies to the relief surface element so that the water optionally may be injected perpendicularly thereto.

In this latter arrangement, the lower part of the annular element keeps the arrangement fluid-tight during the extraction process by pinching the rim of a cartridge against the periphery of the cartridge holder means during positioning of the assembly formed by the cartridge holder, the cartridge holder support and the cartridge.

The present inventions also are characterized by a particular shape of a sealing system designed to promote the release of the cartridge after use. As already mentioned, the usually circular rim of a cartridge is pressed between a lower part of an annular element which surrounds the cartridge and a periphery of the cartridge holder. If this rim is fairly thick, either through the use of thick materials or because of the extra thickness due to the crimping of the two parts of the cartridge to form the rim, sufficient fluid-tightness is achieved readily for extraction by pressing the rim flat with moderate effort. If, on the other hand, the rim is thinner, or to avoid problems of tolerance in the manufacture of the elements, it is preferred to provide a particular system designed to ensure fluid-tightness In an embodiment of a sealing system of the present invention, an outer lower face of the recessed annular element has a conical edge. A cooperating conical part faces it at a periphery of the cartridge holder. The two parts engage in one another, pinching the rim of the cartridge. The cones each form an angle of from about 30° to about 60° with the vertical, this angle preferably being different for each of the two cones limiting the theoretical contact zone to a circular ridge.

In another embodiment of the sealing system, the conical edge of the recessed annular element is situated on the inner lower part. The slope of the cones is thus reversed so that the periphery of the cartridge holder widens downwards.

In a variant of the second embodiment of the sealing system, the peripheral zone of the cartridge holder means is provided with a conical lip in addition to that responsible for fluid-tightness, but sloping in the opposite direction, the effect of which is to push back the extreme lip of the cartridge through the elasticity of the constituent material of that lip.

In these two embodiments, the part integral with the cartridge holder may comprise an element having a certain elasticity designed to compensate for the effect of production tolerances.

In an additional embodiment of the sealing system, a lower part of the annular element presses the lip of the cartridge against an elastic O ring positioned at the periphery of the cartridge holder.

These arrangements are preferred because, apart from the fluid-tightness which they provide, they facilitate the removal of the cartridge from the relief surface element after extraction by utilizing the residual elasticity of its lip which is deformed during locking.

In cases where the support is released from the cartridge holder by a rotary bayonet-type movement, the cartridge remains intact both during locking and during unlocking of the cartridge holder because it can be formed by two main parts which, in a preferred arrangement, are designed to rotate relative to one another, the two parts being the cartridge holder comprising the relief surface element and the grille, on the one hand, the support of the cartridge holder comprising a handle, an outlet orifice for the substance and the diametrically opposite fastening lugs, designed to fit onto the tightening ramps of the tightening ring, on the other hand.

The support of the cartridge holder with its handle undergoes an ascending or descending rotary movement which enables the cartridge to be locked or released. The cartridge holder itself does not rotate, but only makes the ascending or descending movement when or as long as the cartridge adheres to the recessed annular confining element.

In a preferred embodiment of the system, the relief surface element and a sealing cone comprises a lip of which the lower part is in the form of a convex spherical ring of which the center of curvature coincides with an axis perpendicular to the plane of the supporting surface of the cartridge, this spherical lip bearing freely on a seat having a concave surface of the same curvature which is integral with the cartridge holder support and which is preferably made of a material having a low coefficient of friction. The result of this is that the arrangement forms a swiveling assembly. The relief surface element is able to rotate on the above-mentioned seat both during introduction of the unit equipped with a cartridge and during its removal. In addition, this part is able to assume a slight inclination, enabling it to compensate for the inevitable mechanical tolerances of the various components of the assembly and to adapt itself in fluid-tight manner to the rim of the cartridge pressed onto the lower periphery of the part responsible for confinement of the cartridge.

In a modified embodiment, the spherical seat is directly integrated with the support of the cartridge holder.

After the cartridge has been used and in order to facilitate its release, a ring held by a spring may be provided on the outer part of the annular element surrounding the cartridge, the lower part of this collar pushing back the rim of the cartridge when the cartridge holder is released.

In cases where an O ring is responsible for fluid-tightness, the coefficient of friction of the O ring against the rim of the cartridge is sufficient to entrain the cartridge during locking and above all during unlocking without substantial risk of deformation of its extraction face against the relief surface element. The support of the cartridge holder does not necessarily comprise a moving part.

In cases where fluid-tightness is established by conical pinching, a zone peripheral to the pinching zone is preferably roughened to entrain the cartridge as described above. The same effect also may be obtained by the ridges of the indentations of orifices provided at the periphery for the reasons described hereinafter.

A receiving cone for the coffee with a vertical flow channel can be arranged beneath the filtration orifices of the cartridge holder to promote formation of froth by stabilizing and concentrating the flow of coffee. A first cone may be complimented by a second, the function of the first cone, which is situated close to the part comprising the relief, being to break up the jets issuing from the flow orifices and the function of the second cone being to channel the flow towards the final outlet orifice. Both these cones may be formed with perforations, preferably in their upper parts, so that they are able to communicate with the outside atmosphere with the main object being to avoid retention of liquid after the end of an extraction phase of the infusion, the perforations also contributing to formation of a froth through the air which they introduce.

At a periphery of the cartridge holder means and beyond a supporting zone of the cartridge, indentations or orifices may be provided for the removal of water and coffee grounds emanating from the possible discharge from the cartridge through its upper opening after extraction. The flow of water and coffee grounds in question are thus guided through one or more orifices complementary to the orifice intended for the fluid or infusion without soiling that orifice or the inner upper part of the cartridge holder. In any event, this particular flow takes place after extraction of a substance during release of the cartridge. The liquid does not flow into the cup, but usually into a tray covered by a grill on which the cup stands and which may be provided for that purpose. This double exit ensures that the coffee grounds which have been able to remain inside the cartridge holder means are not carried over into a new cup during extraction of the following cartridge. Of course, other pathways for this waste may also be provided to take it to a suitable receptacle.

The invention is described further with reference to the accompanying drawing Figures.

DETAILED DESCRIPTION OF THE DRAWINGS

Figure 1:
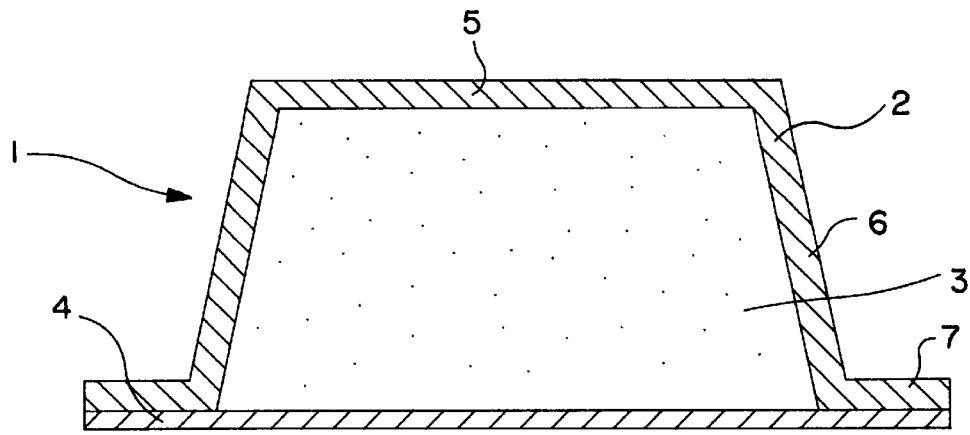
FIGS. 1–3 diagrammatically illustrate three embodiments of a sealed cartridge according to the present invention.

FIG. 1 illustrates a cartridge (1) formed by a cup (2) having a base (5) and a frustoconical sidewall (6) which extends from the base to a lip (7) which extends laterally away from the sidewall about a cup opening, the opening deemed herein to be defined by an edge extent of the sidewall away from the base. The opening is covered by a tear face cover (4) sealed to the lip and which has a thickness less than that of the cup base and wall. The diameter of the opening is greater than a diameter of the base. The cartridge contains a substance (3).

Figure 2:
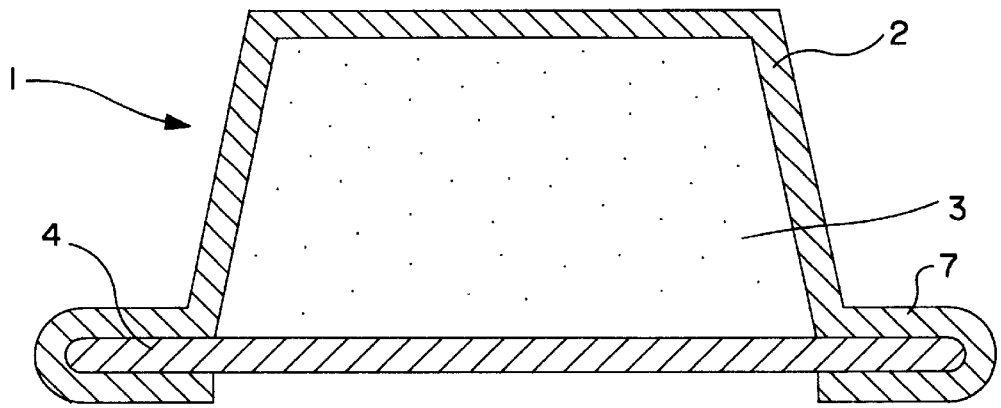

FIG. 2 illustrates a cartridge (1) having a cup (2), as shown in FIG. 1, except that the lip (7) of the cup is wider and is folded over and crimped to cover (4) about the periphery of the cover.

Figure 3:
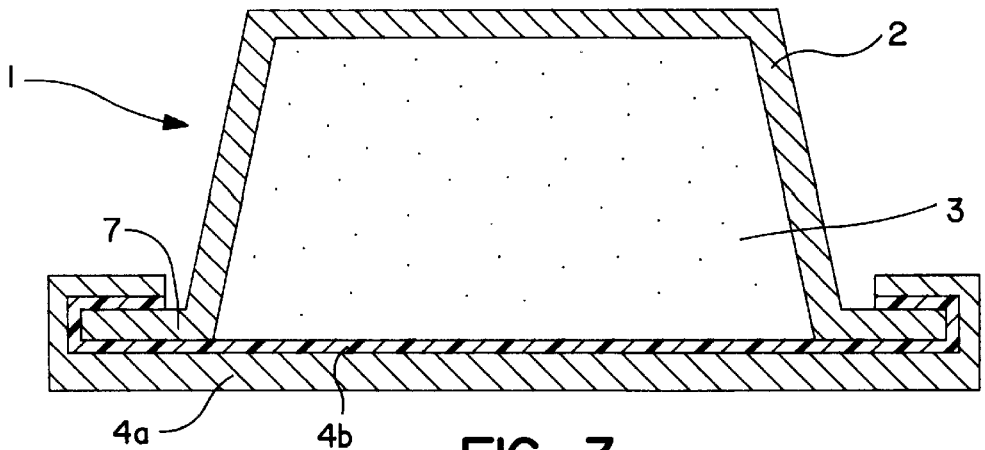

FIG. 3 illustrates a cartridge (1) having a cup (2), as shown in FIG. 1, and a multilayer cover (4a, 4b) which is folded over and crimped to the lip (7).

Figure 4:
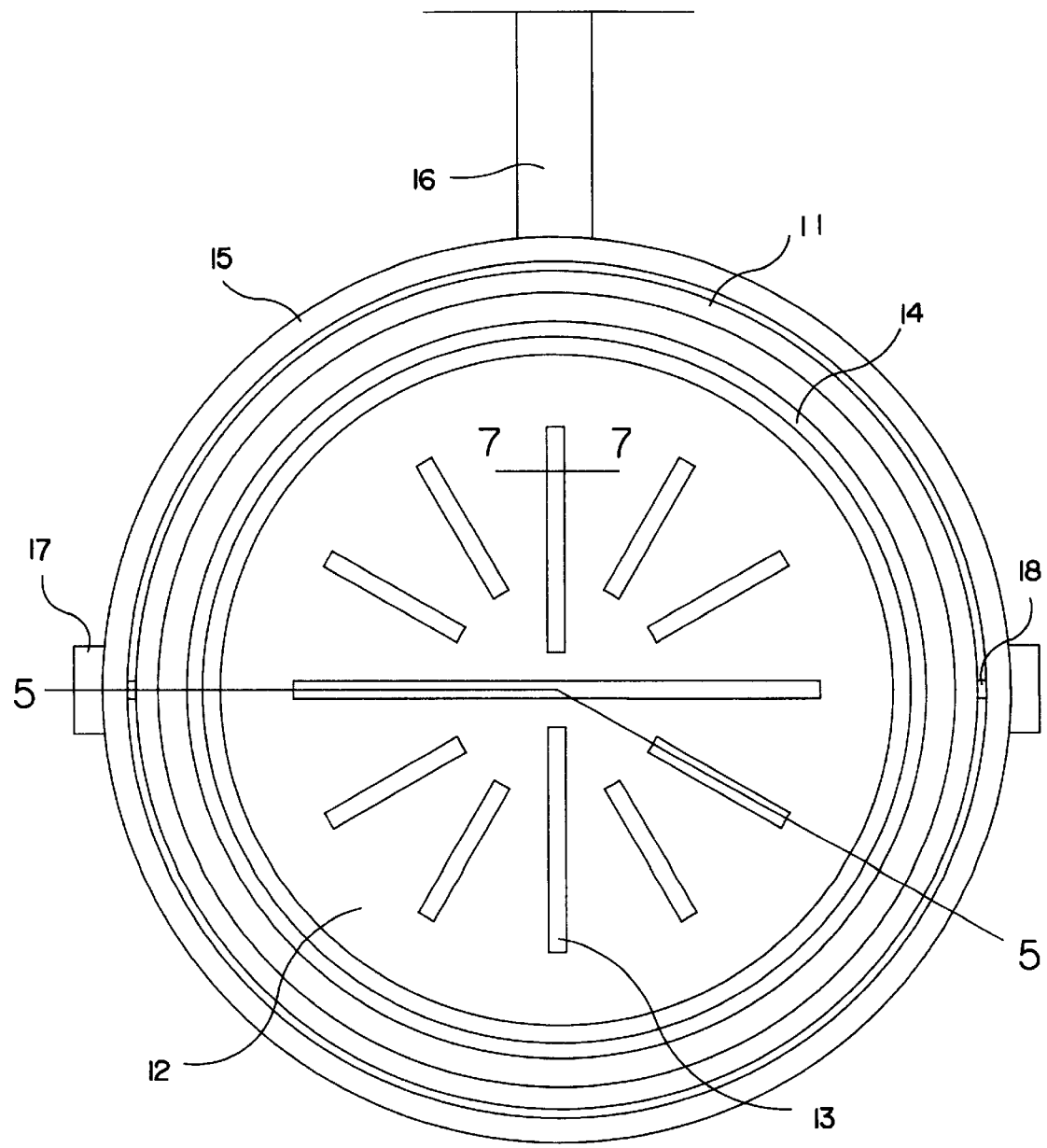
FIG. 4 is a plan view of a cartridge holder and its support.
Figure 5:
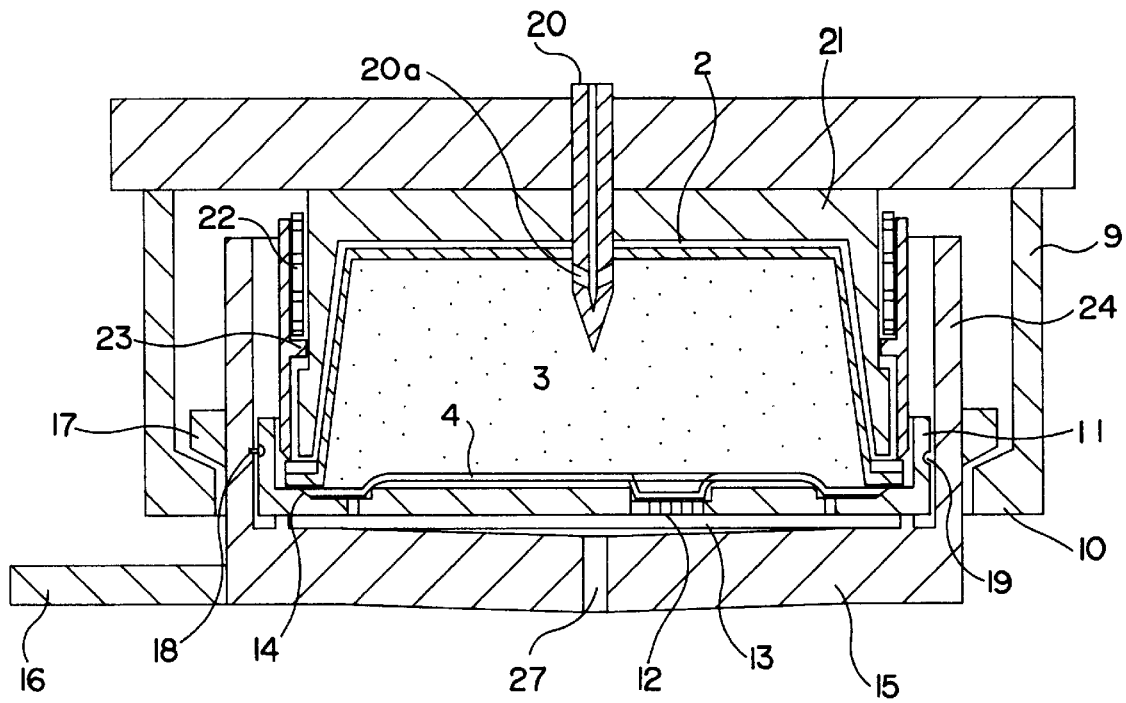
FIG. 5 is a section, through a cartridge in the extraction system on the line 5—5 of FIG. 4.
Figure 6:
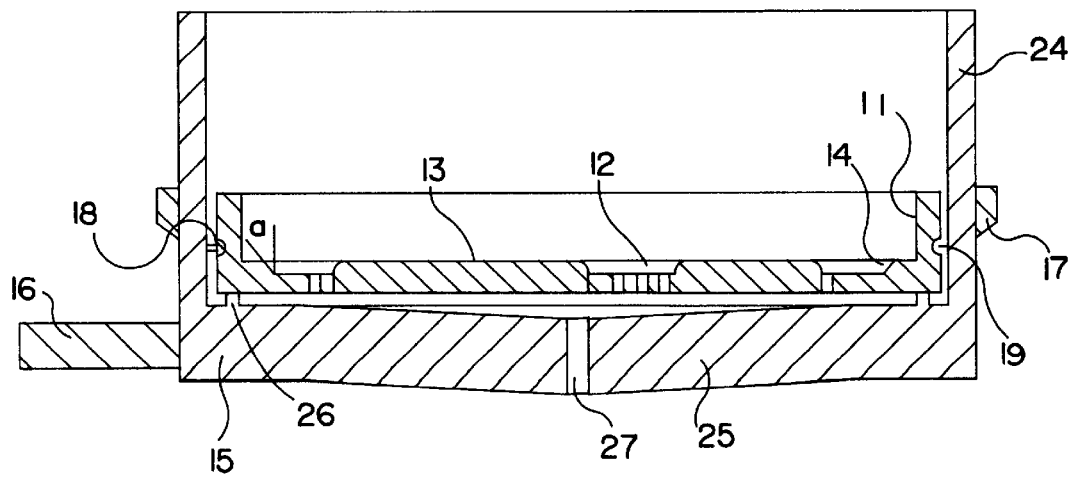
FIG. 6 is a section through the cartridge holder and its support on the line 5—5 of FIG. 4.

Referring to FIGS. 4–6, the cartridge holder (11) comprises a flow grille (12) with relief surface element members (13) and an annular chamfered rim (14). This rim forms an angle alpha with the vertical.

The cartridge holder (11) is accommodated in its support (15) which has a handle (16), a lateral wall (24) which has two diametrically opposite fastening lugs (17) designed to fit onto tightening ramps (10) of a tightening ring (9), as illustrated in FIG. 5, and a bore (27) for the passage of extracted coffee beverage. Provided on the base (25) of the support (15) is an annular protuberance (26) upon which rests the cartridge holder (11), which is able to turn in its support by virtue of two removable pins (18) which cooperate with a groove (19) formed in the cartridge holder.

Referring to FIG. 5, the extraction system further comprises a water injector (20) formed with upwardly directed orifices (20a) and an annular element (21) with an internal recess of which the shape substantially corresponds to the outer shape of the cartridge. The upwardly directed orifices enable injecting water at an ascending angle away from the extraction cover face (4) which enables thoroughly wetting the entire layer of coffee. On its outer part, the annular element (21) comprises a spring (22) holding a ring (23) for releasing the cartridge on completion of extraction.

In operation, a cartridge (1) is placed in the cartridge holder (11). The support (15) then is fixed by its fastening lugs (17) onto the tightening ramps (10) of the tightening ring (9). The water injector (20) pierces the base face of the cup (2). The cover tear face (4) of the cartridge rests on the radially arranged members (13) of the cartridge holder. The fact that the cartridge holder (11) can be rotated in its support (15) ensures that the cartridge remains fixed in relation to the cartridge holder during locking and unlocking, thus avoiding risk of damage to the cartridge.

The water is introduced through the orifices (20a) of the water injector (20) and impinges on the layer (3) of coffee. The pressure in the cartridge increases and the tear face (4) increasingly follows the shape of the radial opening relief surface members (13). When the constituent material of the tear face reaches it breaking stress, the tear face tears along the radial members. The extracted coffee flows through the orifices of the flow grille (12) and is recovered in a container (not shown) beneath the bore (27).

Figure 7A:
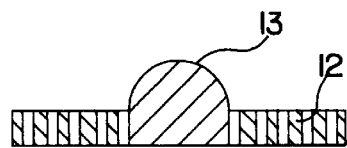
FIGS. 7a to 7d are sections through the radial elements on the line 7—7 of FIG. 4.
Figure 7B:
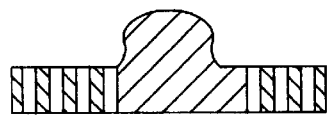
Figure 7C:
Figure 7D:
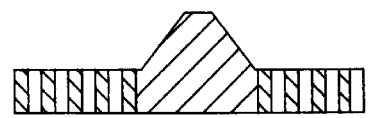

FIGS. 7a to 7d show different shapes for embodiment of radial relief surface element members (13) integrally with a flow screen grille (12). FIGS. 7a and 7b illustrate a rounded element. FIG. 7a illustrates an element having a flattened surface and curved edges. FIG. 7d illustrates a cross-section of an element which is pyramidal in shape having a flattened top surface.

Figure 8:
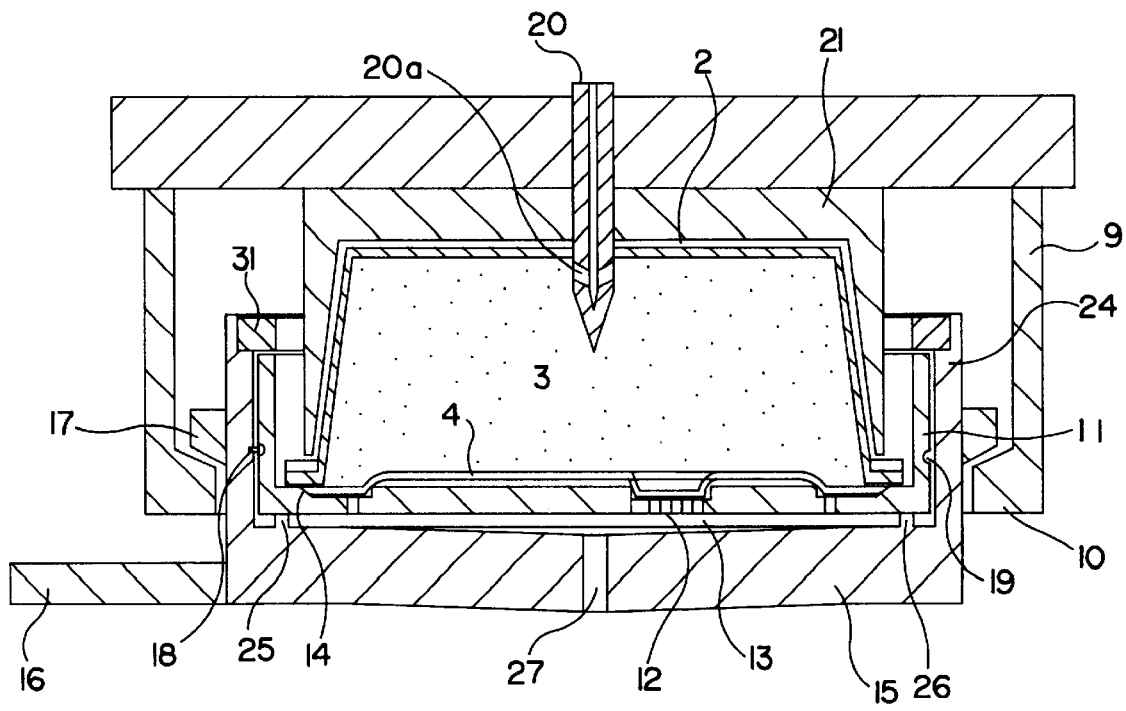
FIG. 8 is a section through a cartridge in an extraction system in a second embodiment of the invention.

In FIG. 8, elements identical with those in FIG. 5 are denoted by the same reference numerals. The system illustrated in FIG. 8 differs from that shown in FIG. 5 solely in the elements participating in the rotation of the cartridge holder (11) relative to its support (15). The cartridge holder is held in its rotation cavity by means of a ring (31) which may be welded, or crimped, or screwed to the support after introduction of the cartridge holder.

Figure 9:
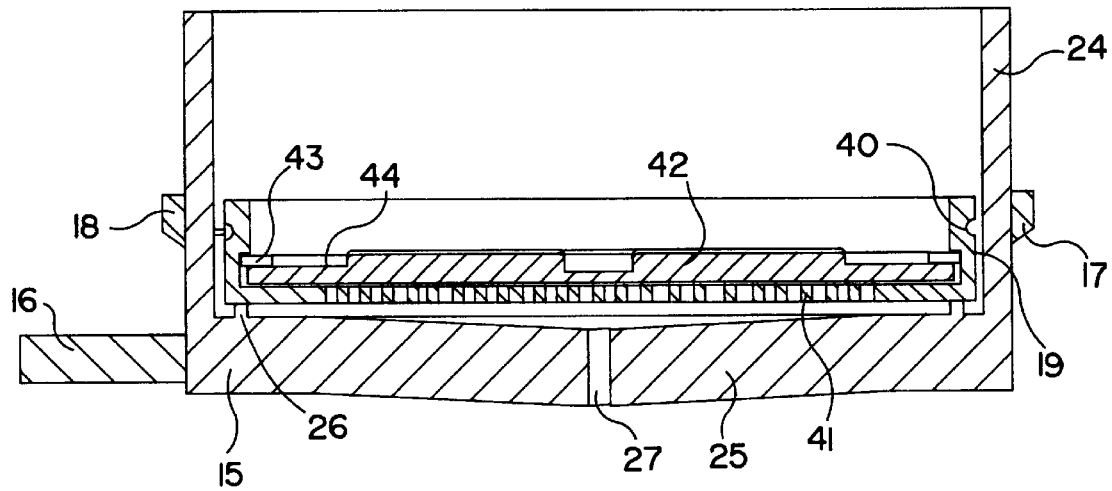
FIG. 9 is a section through a cartridge holder and its support in another embodiment.

In FIG. 9, the cartridge holder (40) differs from that shown in FIG. 6 insofar as it comprises a flow grille (41) having the nature of a screen and, arranged on the screen, a separate relief surface element (44) with projecting members (42) held in position by a ring (43), the cartridge opening function being performed by upper portions of the members (42).

Figure 10:
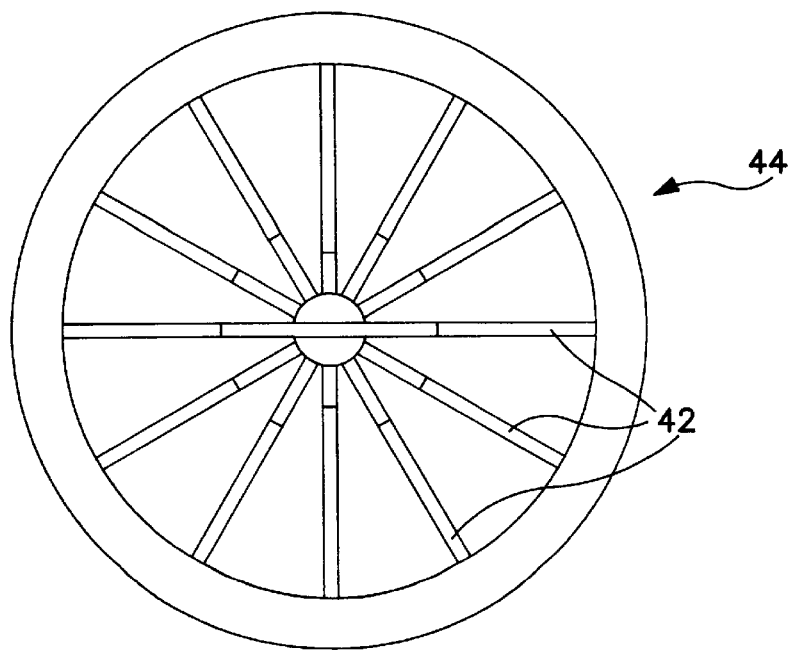
FIG. 10 is a plan view of projecting elements used in the cartridge holder shown in FIG. 9.

FIG. 10 is a more detailed top view of the ring (44) and the radially arranged projecting members (42).

Figure 11:
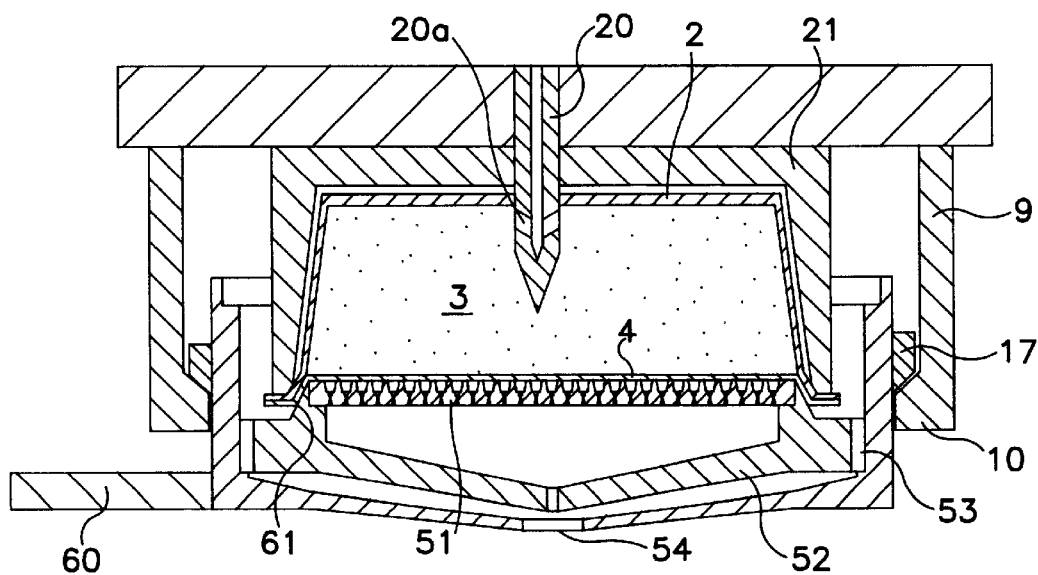
FIG. 11 is a diagrammatic section through a cartridge in an extraction system in another embodiment.

In FIG. 11, elements identical with those in FIG. 8 are denoted by the same reference numerals. The system of FIG. 11 differs from that shown in FIG. 8 in the fact that the cartridge holder (60) is in one piece and also forms the support of the cartridge holder. The cartridge holder comprises a plate (51) with relief surface element projecting members in a form of pyramids and filtration orifices, a coffee receiving cone (52) and openings (53) at the edges for removing the extracted coffee substance through an auxiliary orifice (54). The annular part (61) of the cartridge holder is responsible for fluid tightness by pinching the rim of the cartridge to be extracted against the lower part of the annular element (21).

Figure 12:
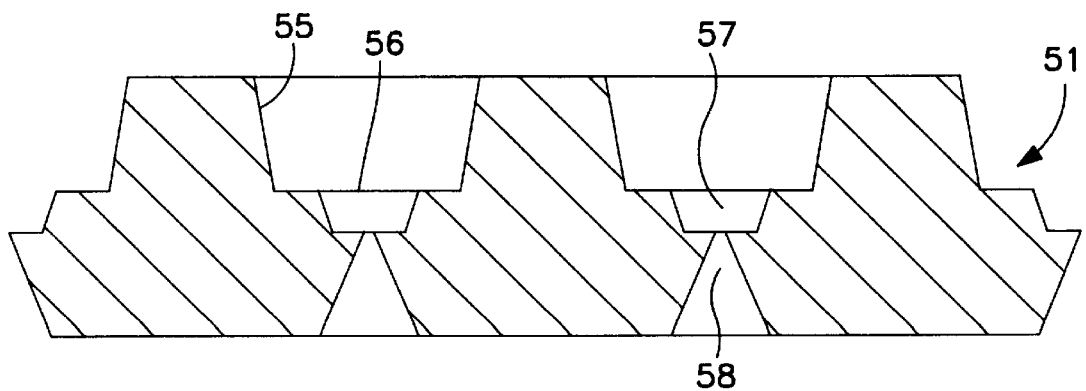
FIG. 12 is an enlarged view of a profile of the relief and recessed elements of the cartridge holder shown in FIG. 11.

FIG. 12 is a detailed section through the plate (51), showing inclined faces (55) of pyramids which may form an angle of from about 10° to about 30° with the vertical, ledges (56) and flow channels (57) comprising orifices (58).

Figure 13:
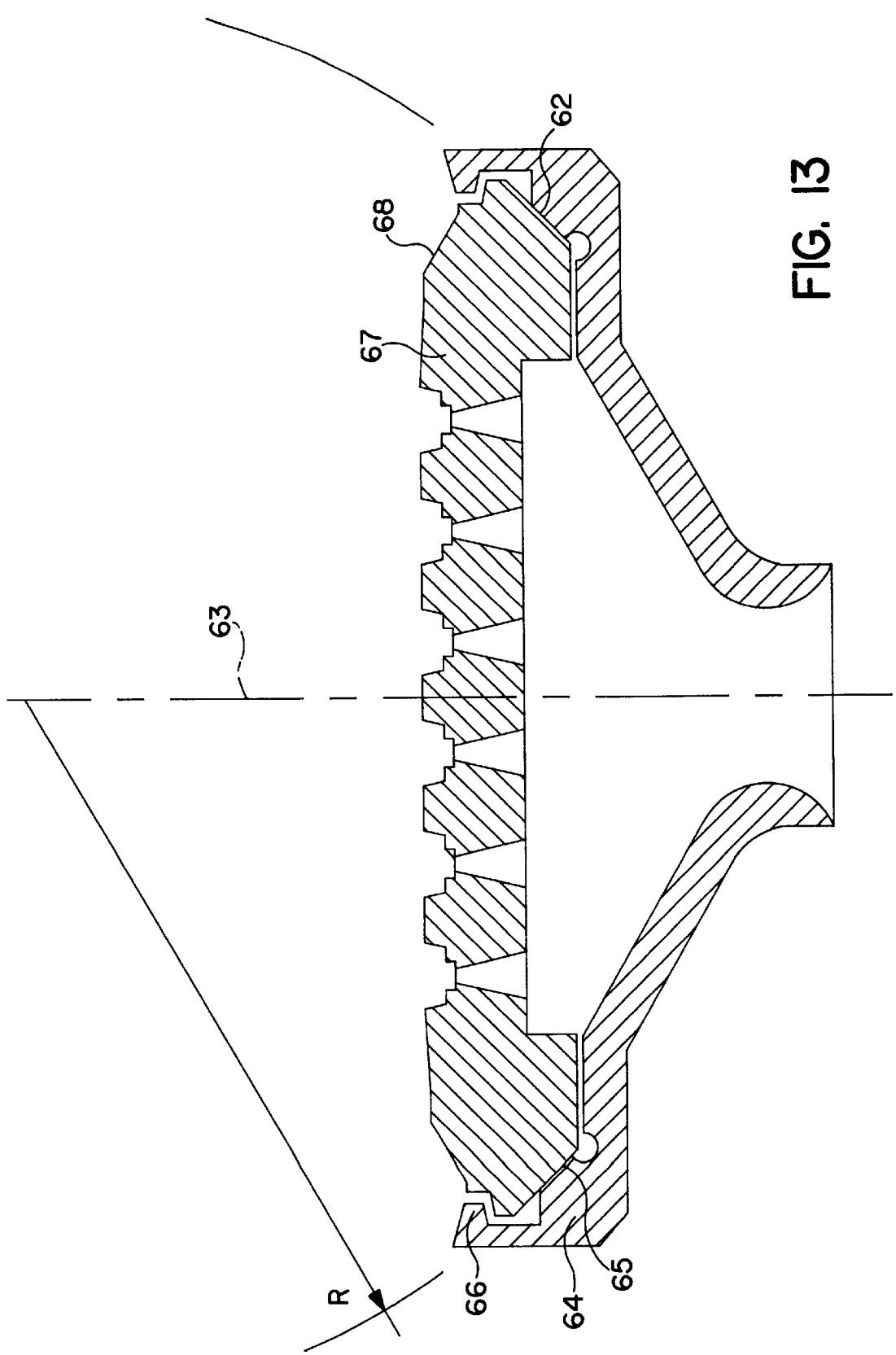
FIG. 13 is a section through a cartridge holder in another embodiment.

FIG. 13 is a section through an embodiment comprising a relief surface element (67) having a conical sealing surface (68) and a spherical supporting surface (62) of which the center of curvature coincides with the axis (63) perpendicular to the plane of the relief element, the angle of slope of the tangent to this ring being approximately 45°. A seat (64) comprises a spherical supporting surface (65) in contact with the corresponding supporting surface of the element (67). The seat (64) is integral with the support of the cartridge holder (not shown). It is preferably made of an alloy or injection-moulded plastic material and, at its periphery, comprises pins (66) which enclose the element forming the supporting surface while leaving sufficient room for the element to be able turn freely and to slope to a sufficient extent. In addition, the support of the cartridge holder (not shown) has sufficient radial play so that if it is fixed to a bayonet, it allows the arrangement as a whole to be centered despite off-centering of the element comprising the relief surface and the sealing cone during its swiveling movement.

Figure 14:
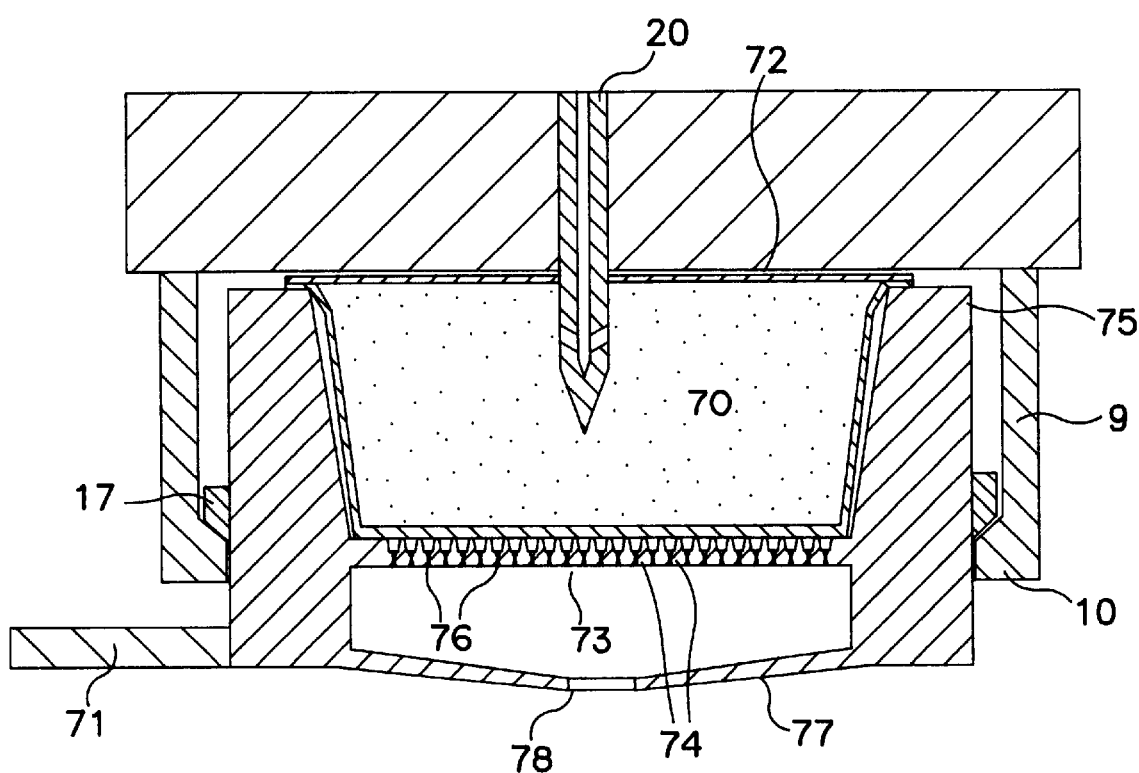
FIG. 14 is a section through a system according to the invention for extraction of cartridges in a shape of inverted frustums.

In FIG. 14, elements identical with those in FIG. 8 are denoted by the same reference numerals. The system illustrated by FIG. 14 differs from that shown in FIG. 8 in the respect that the cartridge to be extracted is in the form of an inverted frustum (70) and, accordingly, does not have an annular element (21). The cartridge holder and its support are in one piece (71). The periphery of the cover face (72) of the cartridge is pinched between the extraction head and an upper part (75) of the cartridge holder. The tear face (73) of the the cartridge bears against the relief surface element (74), which may have members in a shape of a pyramid. The mode of operation is substantially the same as for FIG. 5. Water arrives under pressure through the water injector (20) and passes through the layer of coffee in the capsule. The pressure in the capsule rises and presses the tear face (73) against the projecting members of relief surface element (74). When the breaking stress is reached, the tear face (73) tears against the pyramid members (74) and the coffee beverage flows through the annular orifice (78) via the orifices (76) and the coffee receiving cone (77).

As is clear from the foregoing, various modifications of the present invention may be without departure from the spirit and scope of the disclosure, and the invention may be practiced suitably in the absence of elements not specifically disclosed herein and which may be excluded.

I claim:

1. A sealed cartridge for preparation of a beverage by extraction of the substance under pressure comprising a cup and a cup cover sealed to the cup and roast and ground coffee substance contained by the cover within the cup, there being no marks in the cover for weakening the cover and there being no filter member contained within the cup and cover, and wherein:

the cup comprises (a) a base, (b) a sidewall which extends from the base to an edge about a cup opening which opposes the base and (c) a lip which extends laterally away from the sidewall edge and the opening;

the cover extends across the opening to the lip and is sealed to the lip so that the roast and ground coffee substance is contained within the cup by the cover;

the cup and cover are substantially impermeable to oxygen; and the thicknesses of each of the cup base, sidewall and lip being greater than the thickness of the cover, and the cover has a thickness and a breaking stress so that upon placement of the sealed cartridge in an apparatus for brewing a beverage under pressure, wherein the sealed cartridge is positioned in a holder of the apparatus and the cover is adjacent projections of the apparatus for forming a plurality of openings in the cover which allow flow of coffee beverage extracted from the roast and ground coffee substance through the cover and which restrict roast and ground coffee substance escape from within the cartridge via the openings, and upon injection of water under pressure within the cartridge and into the roast and ground coffee substance positioned in the holder so that pressure within the cartridge increases to within a range of from 2 bar to 15 bar, the cover initially deforms and portions of the cover contact and press against the projections and the water wets and compacts the roast and ground coffee substance and then, subsequently, at a pressure within the range of from 2 bar to 15 bar, the cover portions pressed against the projections reach their breaking stress, break and form the plurality of openings for coffee beverage flow and for restricting the roast and ground coffee substance escape through the cover via the openings.

2. A sealed cartridge according to claim 1 wherein the roast and ground coffee substance is suitable for preparation of an espresso coffee beverage.

3. A sealed cartridge according to claim 1 wherein the cup and cover are aluminum.

4. A sealed cartridge according to claim 3 wherein the base, sidewall and lip thicknesses are from about 90 $\mu$m to about 110 $\mu$m and wherein the cover thickness is from about 20 $\mu$m to about 40 $\mu$m.

5. A sealed cartridge according to claim 4 wherein the sidewall is substantially frustoconical in shape and wherein the opening diameter is greater than the base diameter.

6. A sealed cartridge according to claim 1 wherein the base, sidewall and lip thicknesses are at least 60 $\mu$m and the cover thickness is from about 5 $\mu$m to less than 50 $\mu$m.

7. A sealed cartridge according to claim 6 wherein the sidewall is substantially frustoconical in shape and wherein the opening diameter is greater than the base diameter.

8. A sealed cartridge according to claim 1 wherein the sidewall has a substantially frustoconical shape and wherein the opening diameter is greater than the base diameter.

9. A sealed cartridge according to claim 1 wherein the cover and lip are crimped so that the cup and cover are sealed.

10. A sealed cartridge according to claim 1 wherein there are no marks in the base for weakening the base.

* * * * *